US008161500B2

(12) United States Patent
Tan et al.

(10) Patent No.: US 8,161,500 B2

(45) Date of Patent: Apr. 17, 2012

(54) METHOD AND SYSTEM FOR DYNAMIC INVOCATION OF SERVICES IN A SERVICE-ORIENTED ARCHITECTURE ENVIRONMENT

(75) Inventors: Puay Siew Tan, Singapore (SG); Zunliang Yin, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 1664 days.

(21) Appl. No.: 10/915,730

(22) Filed: Aug. 10, 2004

(65) Prior Publication Data

US 2005/0160434 A1 Jul. 21, 2005

(30) Foreign Application Priority Data

Jan. 15, 2004 (SG) ................................ 200400453-7

(51) Int. Cl.

*G06F 9/44* (2006.01)

*G06F 15/177* (2006.01)

(52) U.S. Cl. ........................................ 719/330; 709/226

(58) Field of Classification Search ................... 719/330

See application file for complete search history.

(56) References Cited

U.S. PATENT DOCUMENTS

| | | | | |
|---|---|---|---|---|
| 7,174,363 | B1 * | 2/2007 | Goldstein et al. | 709/203 |
| 7,444,620 | B2 * | 10/2008 | Marvin | 717/116 |
| 2001/0037417 | A1 | 11/2001 | Meyer | |
| 2003/0007006 | A1 | 1/2003 | Baar et al. | |
| 2003/0070006 | A1 | 4/2003 | Nadler et al. | |
| 2003/0217044 | A1 * | 11/2003 | Zhang et al. | 707/3 |
| 2004/0064503 | A1 * | 4/2004 | Karakashian et al. | 709/203 |
| 2005/0038708 | A1 * | 2/2005 | Wu | 705/26 |
| 2005/0144277 | A1 * | 6/2005 | Flurry et al. | 709/225 |

FOREIGN PATENT DOCUMENTS

| | | | |
|---|---|---|---|
| GB | 2353877 | A | 3/2001 |
| WO | WO 02/058370 | A1 | 7/2002 |

OTHER PUBLICATIONS

International Search Report and Written Opinion issued by the Austrian Patent Office on Jul. 25, 2008 in Application No. 200400453-7, filed on Jan. 15, 2004.

* cited by examiner

*Primary Examiner* — Andy Ho

*Assistant Examiner* — Abdou Seye

(74) *Attorney, Agent, or Firm* — Knobbe Martens Olson & Bear LLP

(57) ABSTRACT

A service-oriented architecture environment system which enables a service to be designed and implemented independently, regardless of the supported protocol and signature requirements of dependent or target services is disclosed. Data type transformation is supported through a context mapping mechanism. The system is configurable during deployment or just before actual invocation of the dependent service(s). The configuration capability is enabled through an XML-based descriptor, and services are invoked based on a given context dynamically during runtime.

17 Claims, 3 Drawing Sheets

```
<context>
 <dependant-interface name="CurrencyRates">
  <calling-methods>
   <calling-method name="getCurrencyRate">
     <mappings default="ABC">
       <mapping name="ABC" protocol="SOAP">
         <service-definition>
          <service- location>http://abc.com/rateservice?WSDL</
service-location>
          <port-type>RateIF</port-type>
           <service-method-name>getRate</service-method-name>
         </service-definition>
          <input-parameter-mappings>
            <input-parameter-mapping>
             <service-parameter parameter-order-number="1">
               <construction-step no="1" name="extract-attribute"
calling-parameter-order-number="1" attribute="baseCountry"/>
              </service-parameter>
              <service-parameter parameter-order-number="2">
               <construction-step no="1" name="extract-attribute"
calling-parameter-order-number="1" attribute="targetCountry"/>
              </service-parameter>
            </input-parameter-mapping>
           </input-parameter-mappings>
           <return-result-mappings>
             <return-result-mapping>
               <construction-step no="1" name="calculate"
formula="result=result/100"/>
               <construction-step no="2" name="type-convert"
from="double" to="float" apply-to="result"/>
           </return-result-mapping>
           </return-result-mappings>
          </mapping>
        </mappings>
      </calling-method>
    </calling-methods>
 </dependant-interface>
</context>
```

Figure 3

METHOD AND SYSTEM FOR DYNAMIC INVOCATION OF SERVICES IN A SERVICE-ORIENTED ARCHITECTURE ENVIRONMENT

FIELD OF INVENTION

The invention generally relates to service-oriented architecture (SOA) environment in a computer network system, and more particularly, to dynamic invocation of services in a SOA environment.

BACKGROUND

In a typical Service-Oriented Architecture (SOA) environment in a computer network system, the use of third-party services is possible. This is especially so in the use of the SOA environment for web services, where a third-party service is any functionality offered, such as an application or software already existing, and a web service is a software component representing a set of specific functions that can be described, published and invoked over the network (typically the Internet) using open standards. The SOA environment enables software applications to be assembled using third-party or existing services, and only where absolutely necessary, to be built. This promotes reuse of the existing applications, and a paradigm shift in the way software is developed.

With the SOA environment infrastructure, application design and development requires less effort, which leads to less expensive software/applications. Software may also be built incrementally such that the software application may be developed as and when new services are required. Software may be rolled out with a much shorter lead-time, leading to more responsiveness to customers' needs. Additionally, applications may be customised with relatively little programming effort to an end user's needs. The end user may be an organisation.

The SOA environment provides a suite of services that can be aggregated or assembled, which in turn may require dependent services. The dependent services are usually predefined and potentially pre-coded into the source code during implementations, as shown in FIG. 1. FIG. 1 shows a block diagram of a conventional SOA arrangement 10 with a calling service 12 with a pre-identified dependency invocation 14 in communication with dependent services 16. With this conventional configuration the mapping and binding information are programmed and fixed during the design or implementation of the application. Amongst the elements that are fixed, for example:

1. Messaging protocol to be used, for example application programming interface (API)— based, Remote Method Interface (RMI), Simple Object Access Protocol (SOAP), JAVA Messaging Service (JMS), or the like;
2. Dependent service name or package that is to be used;
3. Operation or API name of the service to be used;
4. Signature of the operation/API that is to be used, including expected input and expected returned parameters; and
5. Data types expected between calling and invoked services.

There is a subtle difference between operation signature and data type dependencies. Signature pertains to the declaration of expected inputs (including the number of inputs, sequence, etc) and output. Data type is about the type of parameters, for example, int, String, and the like. For example, in Java, there is a difference between Integer and int.

The concept of assembly of services in a SOA environment requires the dependent services to be available and running when needed. As such, if the dependent service(s) 16 shown in FIG. 1 are no longer available or are down, then the service in context is also not available. This brings about the problem of flexibility and reliability of the service in question. In other words, the service is only as reliable as the least reliable service(s) that it is dependent upon. Also, if the supported protocol or API signature, for example, changes in a dependent service 16, the service in context or calling service 12 needs to be changed as well. Furthermore, in a SOA architecture, the ability to replace a service with another service that is providing similar functionality, but without being tied down by the example of fixed elements specified and listed above is crucial to the concept of reuse and mix-match based on end user requirements.

Recent attempts have been made to address this issue, and to increase the flexibility and robustness of services. U.S. Patent Application Publication No. 2003/0,070,006 A1 published on 10 Apr. 2003 in the name of Nadler et al describes a development system providing extensible remoting architecture, and U.S. Patent Application Publication No. 2001/0,037,417 A1 published on 1 Nov. 2001 in the name of Meyer describes a method and system for dynamically dispatching function calls from a first execution environment to a second execution environment. However, both of these systems do not adequately address problems related to having a fixed messaging protocol that is used. U.S. Patent Application Publication No. 2003/0,070,006 tried to address this problem, but as this solution is based on generating code during runtime, the multi-protocol support must be predefined. U.S. Patent Application Publication No. 2003/0,070,006 has the problem of being restricted to the pre-defined protocol supported. U.S. Patent Application Publication No. 2001/0,037,417 is an implementation that is specific to C++ environment only; hence, this system doesn't handle multiple-protocol support issue as discussed in Item 1 at all. U.S. Patent Application Publication No. 2001/0,037,417 can only run in local environments.

Both of these published patent applications fails to address the problem of defining a virtual interface at design time and bind it to an arbitrary (needed) service at runtime.

However, there is no solution to the problem of providing services that can be mixed-and-matched at runtime instead of being tied-in during design or implementation phases. In this context, "runtime" means:

Occurring while a program is being executed, (http://www.computeruser.com/resources/dictionary/)

Occurring while a program is executing. For example, a runtime error is an error that occurs during program execution and a runtime library is a library of routines that are bound to the program during execution. In contrast, compile-time refers to events that occur while a program is being compiled (http://www.webopedia.com/TERM/r/runtime.html).

There is a need for a solution to the problem of providing a system that enables a calling service to be implementation agnostic as well as insulated from changes of dependent services, preferably in an SOA environment.

SUMMARY

In accordance with an aspect of the invention, there is provided a method for dynamic invocation of at least one service in a service-oriented architecture. The method comprises invoking at least one target service in the system dependent upon a calling service; identifying the target service;

mapping one or more parameters of the target service with one or more parameters of the calling service if parameters of the target service and of the calling service differ; and invoking the target service.

The mapping may be performed using a context mapper and mapping rules, for instance with the mapping rules used by an XML based rules engine.

The service functionality required by the calling service may be stored, and preferably the mapping maps the functionality of the target service to the functionality required by the calling service.

Invoking a target service may use a context invocation descriptor, for instance having an XML schema based structure.

In accordance with another aspect of the invention, there is provided a system for dynamic invocation of at least one service in a service-oriented architecture. The system comprises: a component for invocation of at least one target service in the system dependent upon a calling service; and a context manager coupled to the calling service for identifying the target service, mapping one or more parameters of the target service with one or more parameters of the calling service if parameters of the target service and of the calling service differ, and invoking the target service.

The system may further comprise a mapping mechanism coupled to the context manager, the mapping mechanism preferably comprising a context mapper and mapping rules, for instance with the mapping mechanism utilising the rules in an XML based rules engine.

The system may further comprise a component interface through which the at least one target service is invoked. Preferably the interface stores a service functionality required by the component. The mapping may map the functionality of the target service to the functionality required by the component.

The component for invocation preferably comprises a context invocation descriptor, usefully with an XML schema based structure.

The component interface may be a dependency interface.

In either above aspect, the target service may be identified during calling service runtime.

In either above aspect, the at least one target service may comprise a plurality of target services.

BRIEF DESCRIPTION OF THE DRAWINGS

These and other features, objects and advantages of embodiments of the invention will be better understood and readily apparent to one of ordinary skill in the art from the following written description, in conjunction with drawings, in which:

FIG. 3 is an exemplary descriptor for a particular scenario; and

DETAILED DESCRIPTION

The embodiments of the invention are particularly effective and useful in SOA environments as software applications are no longer built as huge monolithic systems. Instead, software applications can now by extensively reused (where this technique is extremely powerful) and built only when necessary. Furthermore, in a SOA environment, the services come in many forms and shapes, and the implementation platforms and protocols used can be different. Hence, the applicability of this technique according to the embodiments of the invention.

In an exemplary embodiment, a service-oriented architecture environment in a computer network system enables a web service to be designed and implemented independently, regardless of the supported protocol and signature requirements of dependent or target services. Data type transformation is supported through a context mapping mechanism. The system is configurable during deployment or just before actual invocation of the dependent service(s). The configuration capability is enabled through an XML-based descriptor, and services are invoked based on a given context dynamically during runtime.

Figure 1:
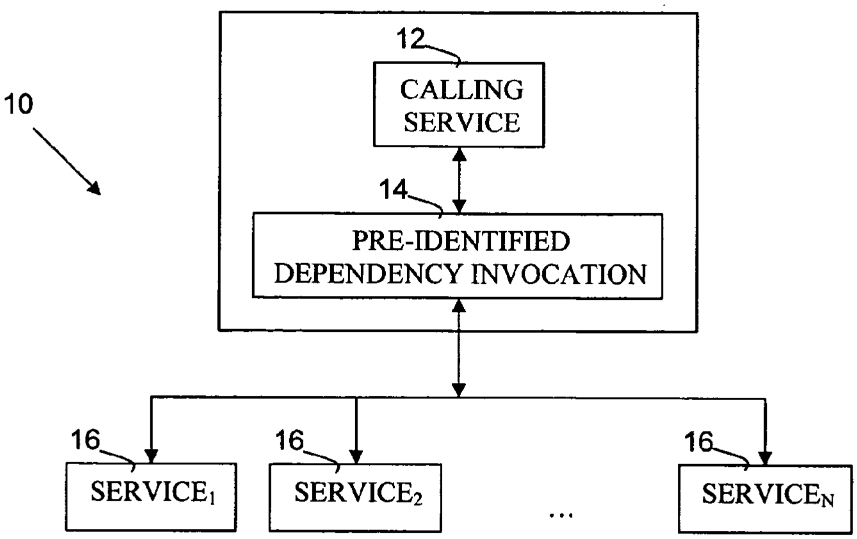
FIG. 1 is a block diagram of a conventional service-oriented architecture (SOA) computer environment.
Figure 2:
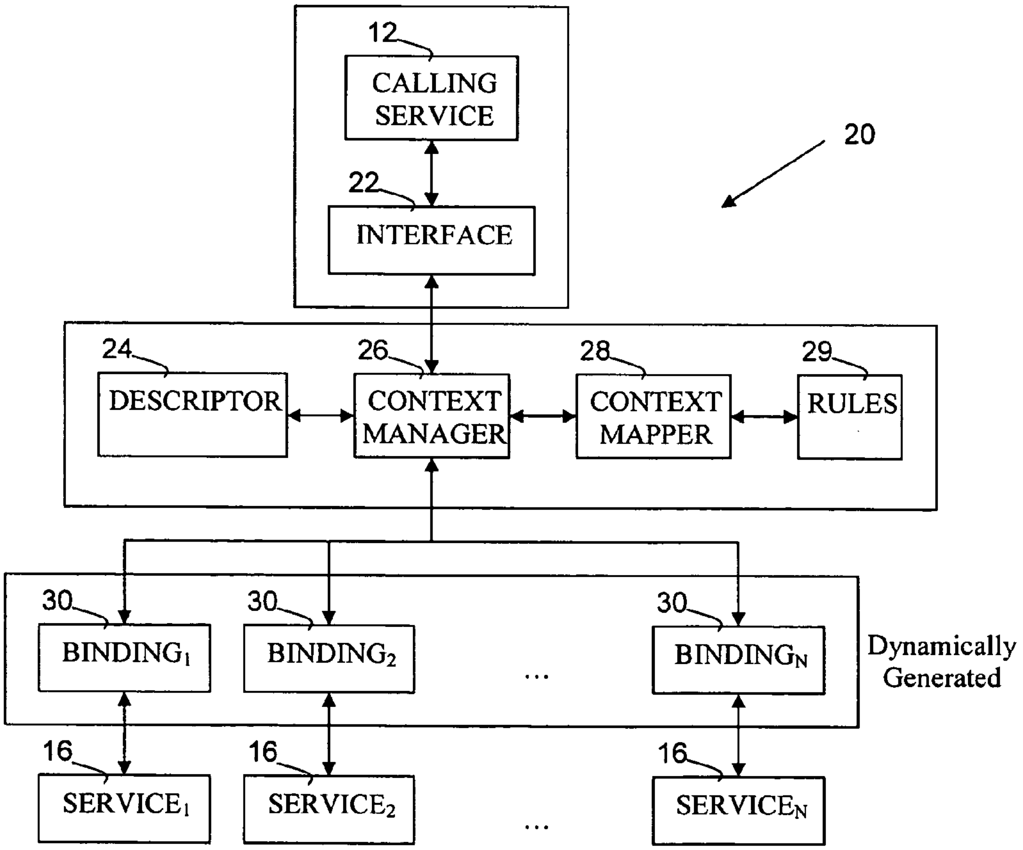
FIG. 2 is a block diagram of a SOA computer environment in accordance with an embodiment of the invention.

FIG. 2 shows a block diagram of a SOA computer environment 20 in accordance with an embodiment of the invention. A calling service or component 12 is deployed together with a dependency interface 22. A dynamic context manager 26 is in communication with the calling service interface 22 for dynamic binding 30 and actual invocation of target services or applications 16. A context invocation descriptor 24 provides schema instructions from the dependency interface 22 to the dynamic context manager 26. A context mapper 28 and mapping rules 29 provide mapping capability to the dynamic context manager 26.

As shown, this embodiment comprises two main parts: the part to be defined within the calling service 12 and the part that is external to the calling service 12. The dependency interface 22 may be deployed as part of the calling service 12 and defines a non-fixed interface that the calling service 12 requires and is present at the design and development of the calling service 12. The dependency interface 22 is a virtual interface that is designed and developed together with the calling service 12. As such this interface 22 is defined based on the needs/requirements of this calling service 12 and stores information as to the functionality of services required by the calling service.

With this, the designer need not know or care about the actual services that are expected to be used during the execution or runtime of this calling service 12.

Later, during, or after the deployment of the application, when the user finds a service that can provide the functionality that the method in the dependency interface 22 expects, the user can configure the binding information in the descriptor 24. The rules-of-thumb or heuristics rules 29 are stored and upgraded (added to and refined) continuously. Through these rules, the mapping capabilities of this technique can be expanded and can grow over time.

The dependency interface 22 is part of the calling service 12. In effect, the calling service 12 and the dependency interface 22 are one component and the context manager 26 and the context mapper 28 are another component.

The context invocation descriptor 24 may be an XML schema based structure that may be configured after the design and development of any calling services, based on the needs of the dependency interface 22 that have been predefined. The descriptor 22 defines the service information such as the protocol of the service, service location, method name and parameters mapping information.

The context mapper 28 utilises a set of mapping rules 29 that has been built in (and continuously updated and improved) to provide the capability to be a 'matchmaker' between differing signatures and data types of calling versus invoked services.

When a calling service 12 invokes a method in the dependency interface 22, the following overall steps occur:

1. The context manager 26 intercepts the call (or invocation) and extracts important information such as input parameters, method name, return type, etc.
2. The context manager 26 elicits information on the actual targeted service ($3^{rd}$ party service that is needed or a dependent service) from the descriptor 24 and locates this service.
3. Information extracted from steps (1) and (2) is passed to the context mapper 28. With the information and the heuristics provided by the rules 29, the context mapper 28 constructs the actual parameters to be passed to the $3^{rd}$ party service.
4. After the parameter reconstruction by the context mapper 28, the context manager 26 invokes the called service and gets the result.
5. Again the returned result is passed to the context mapper 28. The context mapper 28 converts the result to the expected corresponding result of the calling service 12, based on the information as to the service functionality required by the calling service, as stored by the dependency interface 22, again with the aid of defined mapping rules.

The dynamic context manager 26 performs tasks if an invocation is made through the dependency interface 22 based on the information described in the context invocation descriptor 24. This information relates to how to locate a service. In a local environment, this information may be the path of the local service and method name. In a web service environment, this information may be the WSDL (Web Services Description Language) location, service name, and operation name. In an EJB (Enterprise JavaBean) environment, this information may be location information, home class name, and method name. Examples of the type of tasks that are performed may include:

(1) Identify the relevant dependent service(s) that are needed and available, (2) Map the required parameters from the calling service (if necessary) using the context manager 26 (this is actually done by the context manager 26), (3) Invoke the actual service in context, (4) Receive returned parameters or values from invoked services, and (5) Map received parameter into expected return parameters for the calling service (if required) via the context mapper (this is actually done by the context manager 26).

This configuration allows flexibility to be built into a service's dependencies and delays the need to provide binding information as well as actual binding until runtime. The calling service 12 has context that may be independent of the context of the target services or applications 16. For example, an embodiment may have service protocol independence through the mapping capabilities of the context mapper 28 and the mapping rules 29. This embodiment is able provide a mechanism to invoke a target service, regardless of the protocol required, as long as the protocol is supported by the execution environment of the service in context or calling service.

The mapping rules are default mapping rules or rules that may be derived through experience. Examples include casting of data type "long" to "double", an "int" to "String" or "Integer". Others may include conversion of complex data types, for example value objects. All these rules are defined by the user and stored in the rule engine's database. The mapping rules also contain generic heuristic knowledge about combining or breaking parameters between Calling Services and Target Services.

The descriptor 24 provides specifics for the particular instance of invocation, for example, mapping of Parameter-1 from a Calling Service to Parameter-2 of a Target Service, or even combining/breaking parameters from a Calling Service to a Target Service and vice-versa. These two sets of information enable the context mapper 26 to provide the mapping capabilities needed to enable the $3^{rd}$ party or target services to be invoked seamlessly by the Calling Service.

As the binding is delayed until runtime, the actual service name being invoked need not be known until runtime. As such, the service name can be configured during deployment or just before invocation, allowing a service to be developed without dependency on pre-identified services or protocols. In a similar approach to service names, operations or APIs also need not be pre-determined until runtime. Typically, any invocation to a given service requires prior knowledge of the expected input parameters and understanding of the expected return values. The user may define/configure several suitable target services, at runtime the context manager 26 decides which to invoke, according to the runtime context, such as whether the local or a more efficient service is available, versus a remote or less efficient service, for example. Furthermore, as any service is implemented using a programming language, this is useful for ensuring that errors or exceptions do not occur. This embodiment has a mapping mechanism 28, 29 that is able to map expected inputs from given inputs of calling services and vice-versa, for returned values or parameters. The expected data types between the calling and invoked services match, otherwise errors or exceptions will occur through data incompatibility. The mapping of parameters or values need not be one to one mapping; it may, for instance, be one to two mapping or two to one mapping, or some other type (e.g. other non-one to one mapping).

Using an example set forth hereinafter, the getRate operation returns a value of "float" type, but the actual expected return type in the Calling Service is "long". Hence, a conversion is needed, and this is what the mapping rules are able to provide. This embodiment has the ability to cast or map differing data types, within known constraints. Theoretically, the data types can be any type that is supported within the runtime environment. Where the runtime environments of the Calling Service and the Target Service support different data types, the context mapper 28 provides mapping capabilities. It is expected, for extreme cases, that some information, such as numbers or decimals, might be lost. In such cases, the mapping rules can be defined specifically to cater for such instances.

Constraints are defined into the mapping rules. For example, "the length of the new constructed parameter should be less than 10" is a constraint rule. This rule is applied during a parameter reconstruction phase: if the length of the new parameter is greater than or equal to 10, an error is raised before the actual call to the service.

Example

An example is given hereinafter to provide a more full understanding of the embodiment of the invention.

A moneychanger develops a money exchange service (Calling Service). In his service, the moneychanger needs to know the current currency exchange rates of various countries. The moneychanger does not have services that can provide this information directly, so he intends to use some $3^{rd}$ party services (Target Services). The moneychanger has several 3rd party services providers, such as banks, stock exchanges, or some other organisations. The moneychanger has not made his mind up (does not need to) as to which service provider he will actually use. However, he knows he can provide the names of two countries and expects a returned exchange rate between the two countries.

The moneychanger can define a dependency interface in his service, which looks like the following in Table 1 (here Java notation is used, for C++ and other language, this can be changed):

TABLE 1

```
public interface MyMoneyExchanger {
  float getCurrencyRate(CountryBean countryInfo);
}
```

where the CountryBean is a value bean class, with the following structure shown in Table 2.

TABLE 2

```
Class CountryBean {
  String baseCountryName;
  String targetCountryName;
}
```

The expected result of the moneychanger's request is how much One-Unit of the currency of "baseCountryName" can be exchanged for, in the currency of "targetCountryName". For example if one US dollar can exchanged for 1.70 Singapore dollar, the returned result should be 1.70 and "baseCountryName" is "US" and "targetCountryName" is "Singapore".

After the development is completed, the moneychanger can configure his preferred service provider's information into the descriptor. For example, ABC bank's "getRate" service is selected. The ABC bank's service has the following signature:

long getRate(String desCountryName, String srcCountryName).

The meaning of the service is how much 100 dollars, in the currency of "srcCountryName", can be exchanged for of the currency of "desCountryName". As such, if "srcCountryName" is "US" and "desCountryName" is "Singapore", the expected result of 170 means that 100 US dollars can be exchanged for 170 Singapore dollars.

To make use of the ABC's "getRate" service, the moneychanger must first define the service information in the descriptor, for example (segment from the complete descriptor in FIG. 3) as shown in Table 3:

TABLE 3

```
<service-location>http://abc.com/rateservice?WSDL</service-location>
<port-type>RateIF</port-type>
<service-method-name>getRate</service-method-name>.
```

The moneychanger also needs to define the following service mapping information in the descriptor. When calling to the method "getCurrencyRate" in the calling service, the calling is mapped to the method "getRate" in the called service. The value of the first parameter of the called service is extracted from the value of the attribute "baseCountryName" in the calling method's parameter. The value of the second parameter of the called service is extracted from the value of the attribute value "targetCountryName" in the calling method's parameter. The result obtained from the called method is divided by 100. A sample of a complete DESCRIPTOR for this scenario is listed in FIG. 3.

Knowledge as to the way to convert/map differing data types, such as converting a "long" type to a "float" type, how to extract the attributes from a Bean, etc. is defined as RULES, as shown in Table 4.

TABLE 4

```
//specific rules
; extract attribute value from bean rule
if the command is extraction of attribute
then
        get the value object
        get the attribute name
        introspect the bean object and extract the value
; calculate formula rule
if the command is calculate
then
        get the formula
        get each object on right hand part of the formula
        execute the calculation
// constraint rule
if the length of first reconstructed parameter of getRate >10
then
        raise error
if the first reconstructed parameter of getRate is not a country
then
        raise error
//generic rules
if source is a vector and target is an array
then
        convert the vector into an array
if source is long and target is float then
        execute new Long(source).floatValue( )
if source is string and target is int then
        execute new Integer(source).intValue( )
...
```

At runtime, when the calling service calls the method "getCurrencyRate" in the dependency interface, overall steps 1.-5. (mentioned earlier) are applied. At a later time, if the money exchanger finds another or new service provider, he can define/configure new mapping information in the descriptor, without re-coding or changing his service.

Figure 4:
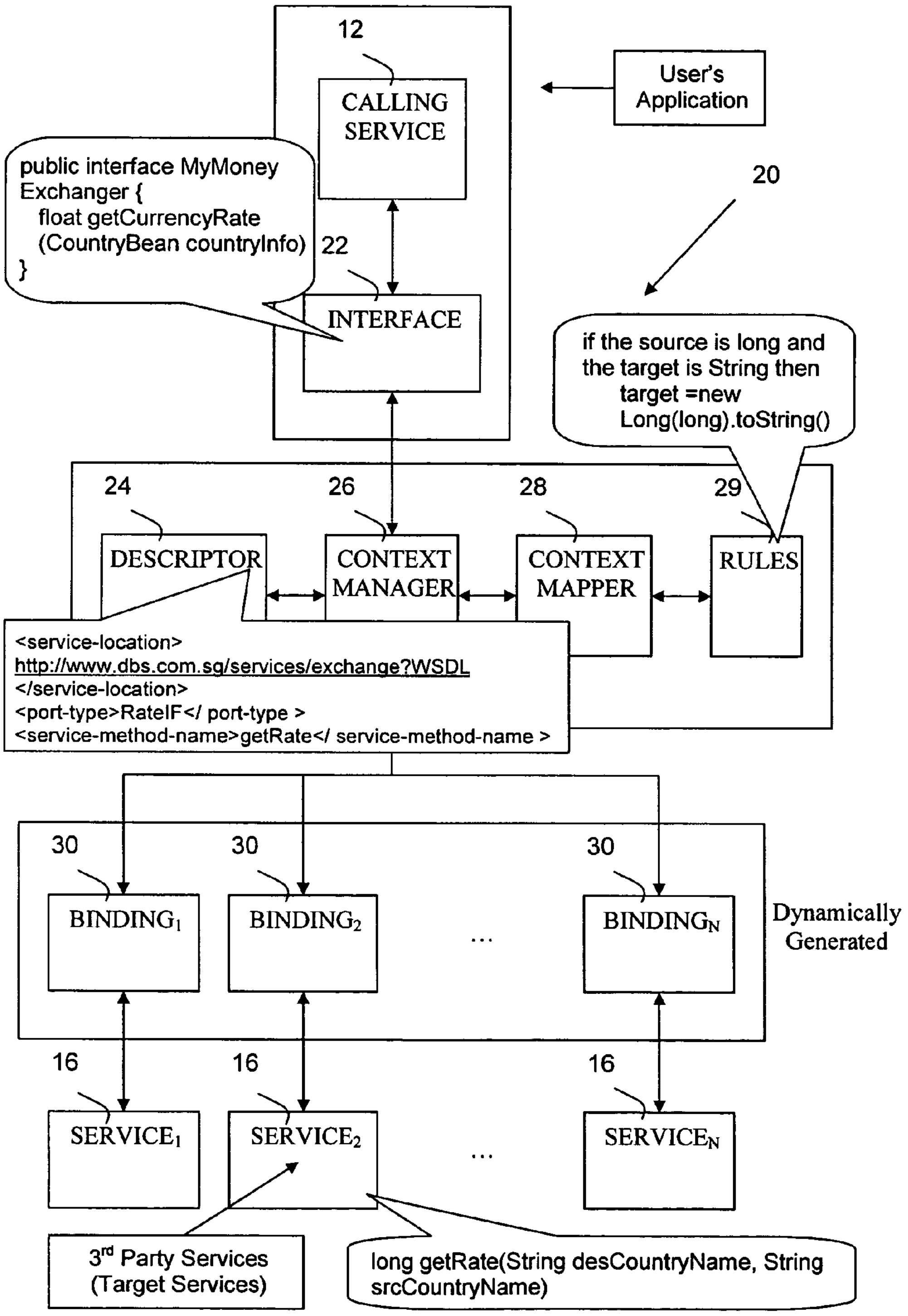
FIG. 4 is an illustration of an exemplary scenario applied to the environment of FIG. 2.

FIG. 4 provides a detailed illustration of the technique of FIG. 2 in terms of this above example.

In the foregoing manner, a method and system are disclosed. Only one main embodiment, with some potential variations is described. However, it will be apparent to one skilled in the art in view of this disclosure that numerous changes and/or modifications may be made without departing from the scope of the invention.

The invention claimed is:

1. A method for dynamic invocation of at least one service in a service oriented architecture, comprising:

making an invocation call from a calling service;

intercepting the invocation call and extracting information from the invocation call;

identifying at least one target service based on the extracted information from the invocation call and based on information from a context descriptor external to the invocation call;

mapping one or more parameters of the target service with one or more parameters of the calling service if parameters of the target service and of the calling service differ; and invoking the target service;

wherein the information from the context descriptor comprises one or more of: information for conversion of a first parameter from the calling service to a second parameter of the target service, information on combining a first set of parameters from the calling service to a third parameter of the target service and vice-versa, and information on breaking a fourth parameter from the calling service to a second set of parameters of the target service and vice-versa, and wherein the mapping is performed using the information extracted from the intercepted invocation call, the information from the context descriptor and mapping rules.

2. A method according to claim 1, wherein the mapping rules are used by an XML based rules engine.

3. A method according to claim 1, wherein the mapping maps a functionality of the target service to the service functionality required by the calling service.

4. A method according to claim 1, wherein the invoking the target service uses the information from the context descriptor.

5. A method according to claim 1, wherein the mapping is one to one mapping, one to two mapping or two to one mapping.

6. A method according to claim 1, wherein at least one target service comprises a plurality of target services.

7. A method according to claim 1, wherein the target service is identified during calling service runtime.

8. A system for dynamic invocation of at least one service in a service oriented architecture, comprising:

a calling service implemented on a computer for making an invocation call;

a context manager implemented on a computer for intercepting the invocation call, for extracting information from the invocation call, and for identifying at least one target service based on the extracted information from the invocation call and based on information from a context descriptor external to the invocation call; and an XML based rules engine implemented on a computer and coupled to the context manager for providing rules for mapping, wherein the context manager is further adapted for mapping one or more parameters of the target service with one or more parameters of the calling service if parameters of the target service and of the calling service differ and wherein the context manager is further adapted for invoking the target service using the rules for mapping;

wherein information from the context descriptor comprises one or more of: information for conversion of a first parameter from the calling service to a second parameter of the target service, information on combining a first set of parameters from the calling service to a third parameter of the target service and vice-versa, and information on breaking a fourth parameter from the calling service to a second set of parameters of the target service and vice-versa.

9. A system according to claim 8, wherein the mapping maps a functionality of the target service to the functionality required by the calling service.

10. A system according to claim 8, wherein the invoking the target service is based on the information from the context descriptor.

11. A system according to claim 8, wherein the mapping by the context manager is one to one mapping, one to two mapping or two to one mapping.

12. A system according to claim 8, wherein the at least one target service comprises a plurality of target services.

13. A system according to claim 8, wherein the target service is identified during runtime of the calling service.

14. A method for dynamic invocation of at least one service in a service oriented architecture for exchanging currency, comprising:

making an invocation call from a currency exchange calling service;

intercepting the invocation call and extracting information indicative of the exchange base country and exchange target country from the invocation call;

identifying at least one target service for providing information indicative of at least an exchange rate of one or more countries based on the extracted information from the invocation call and based on information from a context descriptor external to the invocation call;

mapping one or more parameters of the target service with one or more parameters of the calling service if parameters of the target service and of the calling service differ; and invoking the target service, wherein the information from the context descriptor comprises one or more of: information for conversion of a first parameter from the currency exchange calling service to a second parameter of the target service, information on combining a first set of parameters from the calling service to a third parameter of the target service and vice-versa, and information on breaking a fourth parameter from the calling service to a second set of parameters of the target service and vice-versa, and wherein the mapping is performed using the information extracted from the intercepted invocation call, the information from the context descriptor and mapping rules.

15. A method according to claim 14, wherein the invoking the target service uses the information from the context descriptor.

16. A method according to claim 14, wherein the mapping is one to one mapping, one to two mapping or two to one mapping.

17. A method according to claim 14, wherein the target service is identified during calling service runtime.

* * * * *